United States Patent
Jang et al.

(10) Patent No.: US 7,960,048 B2
(45) Date of Patent: Jun. 14, 2011

(54) ELECTRODE ASSEMBLY FOR LITHIUM ION SECONDARY BATTERY AND LITHIUM ION SECONDARY BATTERY USING THE SAME

(75) Inventors: Seok Gyun Jang, Yongin-si (KR); Yooeup Hyung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 422 days.

(21) Appl. No.: 11/646,448

(22) Filed: Dec. 28, 2006

(65) Prior Publication Data
US 2007/0154787 A1   Jul. 5, 2007

(30) Foreign Application Priority Data
Dec. 29, 2005 (KR) .......................... 10-2005-0134546

(51) Int. Cl.
*H01M 2/02* (2006.01)
*H01M 2/16* (2006.01)
(52) U.S. Cl. .......................... 429/94; 429/174; 429/254
(58) Field of Classification Search .................. None
See application file for complete search history.

(56) References Cited

U.S. PATENT DOCUMENTS
2005/0069764 A1   3/2005   Kodama et al.

FOREIGN PATENT DOCUMENTS
| JP | 6-150971 | 5/1994 |
| JP | 06-181058 | 6/1994 |
| JP | 11-144763 | 5/1999 |
| JP | 2001-273933 | * 10/2001 |
| JP | 2003-151634 | 5/2003 |
| KR | 10-2000-0051639 | 8/2000 |
| KR | 10-2006-0022126 | 3/2006 |

* cited by examiner

*Primary Examiner* — John S Maples
(74) *Attorney, Agent, or Firm* — Christie, Parker & Hale, LLP (57) ABSTRACT

An electrode assembly for a lithium ion secondary battery and a lithium ion secondary battery using the same are provided. In a sealing tape attached to the outer circumference of the electrode assembly in order to prevent the wound electrode assembly from being unwound, the sealing tape is formed of the material having an affinity for the electrolyte to absorb the electrolyte and to swell or the external or internal surface of the conventional sealing tape is coated with such a material so that, when the sealing tape is impregnated with the electrolyte, the sealing tape swells to attach the electrode assembly and the can to each other and to thus prevent the welding parts of the electrode tabs from being disconnected due to the rotation or floating of the electrode assembly.

24 Claims, 7 Drawing Sheets

ELECTRODE ASSEMBLY FOR LITHIUM ION SECONDARY BATTERY AND LITHIUM ION SECONDARY BATTERY USING THE SAME

CROSS-REFERENCE TO RELATED APPLICATIONS

This application claims the benefit of Korean Application No. 2005-134546, filed Dec. 29, 2005, in the Korean Intellectual Property Office, the disclosure of which is incorporated herein by reference.

BACKGROUND OF THE INVENTION

1. Field of the Invention

Aspects of the present invention relate to an electrode assembly for a lithium ion secondary battery and a lithium ion secondary battery using the same, and more particularly, to an electrode assembly for a lithium ion secondary battery in which a sealing tape attached to the outer circumference of an electrode assembly is formed of a material that has an affinity for an electrolyte and that absorbs the electrolyte to swell, or the external surface or the internal surface of the sealing tape is coated with the material so that the coating of the sealing tape swells when the electrode assembly is impregnated with the electrolyte, so that the electrode assembly is closely attached to a can, preventing the welding part of an electrode tab from being short circuited by the rotation or the floating of the electrode assembly and a lithium ion secondary battery using the same. A coated sealing tape of which the coating has a high affinity for an electrolyte and that absorbs the electrolyte to swell and a lithium ion secondary battery using the same are provided.

2. Description of the Related Art

In general, as portable wireless apparatuses, such as video cameras, mobile telephones, and portable computers, are lightweight and require sufficient energy sources, much research is dedicated to the secondary batteries used as the driving power sources of such apparatuses. The secondary batteries include an Ni—Cd battery, an Ni-MH battery, an Ni—Zn battery, and an Li-ion secondary battery. Among the above batteries, the Li-ion secondary battery is rechargeable and small, has a large capacity, and high operation voltage and energy density per unit weight. Thus, the Li-ion secondary battery is widely used in the portable electronic apparatus field.

Figure 1:
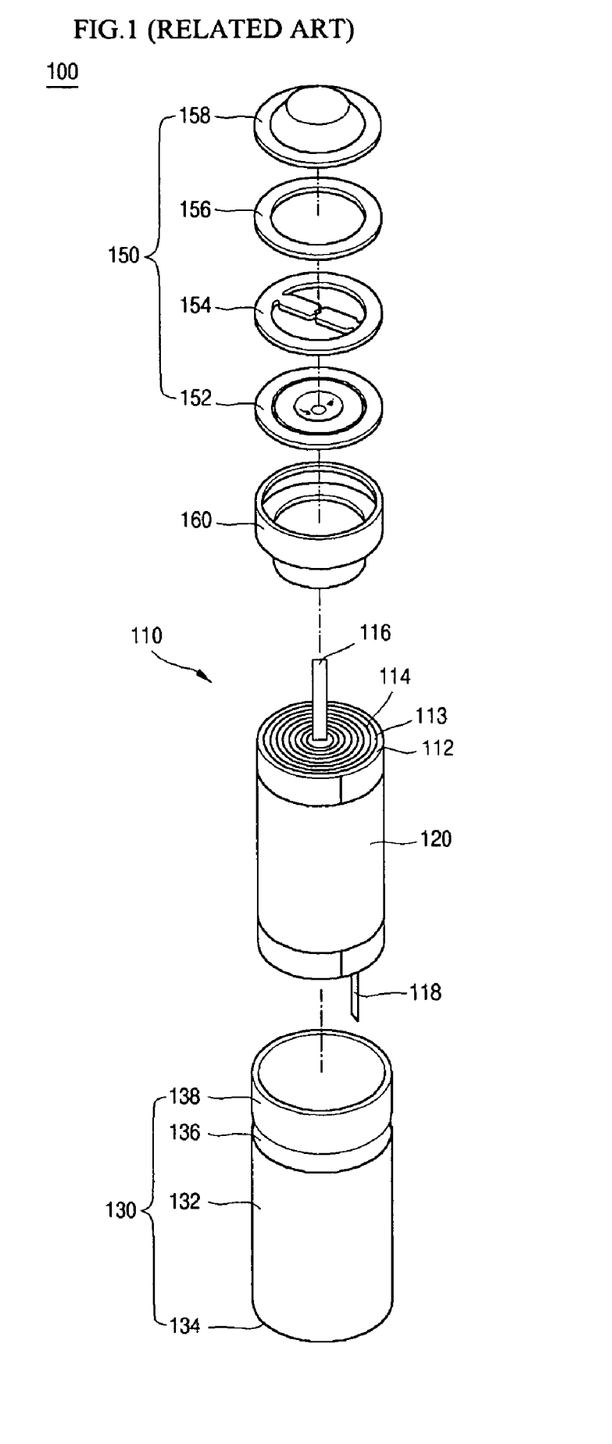
FIG. 1 is an exploded perspective view of a common cylinder-type lithium ion secondary battery.

FIG. 1 is an exploded perspective view of a common cylinder-type lithium ion secondary battery. A cylinder-type lithium ion secondary battery is herein described.

Referring to FIG. 1, a cylinder-type lithium ion secondary battery 100 includes an electrode assembly 110, a cylinder-type can 130 for accommodating the electrode assembly 110, an electrolyte, an insulating gasket 160, and a cap assembly 150 assembled with the upper part of the cylinder-type can 130 to seal the cylinder-type can 130 and to allow the flow of the current generated by the electrode assembly 110 to an external apparatus.

In the electrode assembly 110, a positive electrode plate 112 obtained by coating the surface of a positive electrode collector with a positive electrode coating portion, a negative electrode plate 114 obtained by coating the surface of a negative electrode collector with a negative electrode coating portion, and a separator 113 positioned between the positive electrode plate 112 and the negative electrode plate 114 to electrically insulate the positive electrode plate 112 and the negative electrode plate 114 from each other are wound to form a jelly-roll-like structure. Although not shown in the drawing, the positive electrode plate 112 can include the positive electrode collector formed of a thin metal plate having excellent conductivity, for example, an aluminum (Al) foil. The positive electrode plate 112 can also include the positive electrode coating portion, which coats the both surfaces of the positive electrode collector. A portion of the positive electrode collector without the positive electrode coating, that is, having a positive electrode non-coating portion, can be formed on both ends of the positive electrode plate 112. A positive electrode tab 116 that is formed of aluminum (Al) protrudes above the electrode assembly 110 and can be connected to the one end of the positive electrode non-coating portion.

Also, the negative electrode plate 114 comprises a negative electrode collector formed of a conductive thin metal plate, for example, a copper (Cu) or nickel (Ni) foil. And, the negative electrode plate 114 can include the negative electrode coating portion, which coats both surfaces of the negative electrode collector. A portion of the negative electrode collector without the negative electrode coating, that is, having a negative electrode non-coating portion, can be formed on both ends of the negative electrode plate 114. A negative electrode tab 118 that is formed of nickel (Ni) and protrudes downward from the electrode assembly 110 can be connected to the one end of the negative electrode non-coating portion. Insulating plates (not shown) for preventing the electrode assembly 110 from being connected to the cap assembly 150 and the cylinder-type can 130 can be further provided about the electrode assembly 110. A sealing tape 120 for supporting, protecting, and insulating the electrode assembly 110 is wound around the outer circumference of the electrode assembly 110. The sealing tape 120 is commonly formed of a polyolefin based material such as polyethylene (PE), polypropylene (PP), and polyimide (PI).

The cylinder-type can 130 includes a cylinder-type side plate 132 having a predetermined internal diameter. The internal diameter of the cylinder-type side plate 132 determines the size of the space within which the cylinder-type electrode assembly 110 is accommodated. The cylinder-type can 130 further comprises a bottom plate 134 to seal the lower part of the cylinder-type side plate 132. The upper part of the cylinder-type side plate 132 can be opened so that the electrode assembly 110 may be inserted. The negative electrode tab 118 of the electrode assembly 110 can be connected to the center of the bottom plate 134 of the cylinder-type can 130 so that the cylinder-type can 130 can function as the negative electrode. Also, the cylinder-type can 130 is commonly formed of nickel (Ni), steel (Fe), or an alloy of the above metals. A crimping unit 138 may be formed in the cylinder-type can 130 to couple the upper end of the cylinder-type can 130 to the cap assembly 150. A beading unit 136 is formed inwardly recessed in the cylinder-type can 130 to press the lower part of the cap assembly 150, and the beading unit 136 is formed a distance corresponding to the thickness of the cap assembly 150 below the crimping unit 138.

The cap assembly 150 can include a safety vent 152, a current intercepting unit 154, a secondary protective element 156, and a cap-up 158. A protrusion that extends downward can be formed in the center of the safety vent 152. The protrusion is positioned in the lower part of the cap assembly 150 and may be transformed upward by the pressure generated in the secondary battery. A positive electrode tab 116 is withdrawn from one electrode plate between the positive electrode plate 112 and the negative electrode plate 114 of the electrode assembly 110; for example, the positive electrode plate 112 is welded to the predetermined position of the bottom of the safety vent 152 so that the safety vent 152 and the positive electrode plate 112 of the electrode assembly 110 are electrically connected to each other. A negative electrode tab 118 is withdrawn from one electrode plate between the positive electrode plate 112 and the negative electrode plate 114; so, the negative electrode plate 114 is electrically connected to the cylinder-type can 130 by the negative electrode tab 118. The connection of the negative electrode plate 114 and the negative electrode tab 118 can be electrical, direct, or any other connection to transfer current and electrons. The safety vent 152, the current intercepting unit 154, and the secondary protective element 156 prevent explosion of the secondary battery 100 by failing and releasing pressure. The safety vent 152 is transformed or broken when the pressure in the cylinder-type can 130 increases too much and damages the current intercepting unit 154. Also, the current intercepting unit 154 is damaged when the safety vent 152 is transformed to intercept current. The secondary protective element 156 intercepts current when the current in the current intercepting unit 154 exceeds a predetermined current the. Furthermore, a conductive cap-up 158 is provided to supply a positive electrode voltage or a negative electrode voltage to the outside is further positioned on the secondary protective element 156.

The insulating gasket 160 surrounds lateral portions of the safety vent 152, the current intercepting unit 154, the secondary protective element 156, and the cap-up 158 from the cylindrical-type can 130 as the cylindrical-type can 130 acts as the negative electrode.

Generally, the electrode assembly 110 easily floats and rotates in the cylinder-type can 130. As the electrode assembly 110 floats and rotates, so do the positive and negative electrode tabs 116 and 118, respectively. When an external shock, such as falling, is inflicted upon the cylinder-type lithium ion secondary battery, the welding part between the positive electrode tab 116 and the safety vent 152 and the welding part between the negative electrode tab 118 and the cylinder-type can 130 are damaged so that the internal circuit of the battery becomes disconnected. There is little change in the case of a polygon-type lithium ion secondary battery. The electrode assembly also floats and rotates such that the welding part of an electrode tab is damaged resulting in the internal circuitry of the battery becoming disconnected.

SUMMARY OF THE INVENTION

In order to solve the above-described and/or other problems, it is an aspect of the present invention to provide an electrode assembly for a lithium ion secondary battery in which a sealing tape attached to the outer circumference of an electrode assembly is formed of a material that has an affinity for an electrolyte and that absorbs the electrolyte to swell. Another aspect of the current invention includes the external surface or the internal surface of the sealing tape being coated with a material having a high affinity for the electrolyte so that the coating of the sealing tape swells when the electrode assembly is impregnated with the electrolyte. Another aspect of the current invention comprises the electrode assembly being closely attached to the can to prevent the welding part of an electrode tab from being damaged by the rotation and floating of the electrode assembly. Another aspect is a lithium ion secondary battery using the above-described aspects.

In order to achieve the foregoing and/or other aspects of the present invention, there is provided an electrode assembly for a lithium ion secondary battery comprising a positive electrode plate and a negative electrode plate that face each other, a separator interposed between the positive electrode plate and the negative electrode plate, and a sealing tape attached to the outer circumference of a jelly roll. The jelly roll is obtained by first layering the positive electrode plate, the separator, and the negative electrode plate, then rolling the positive electrode plate, the separator, and the negative electrode plate to form a cylinder. The sealing tape absorbs an electrolyte and swells. The sealing tape can be attached to wrap about the outer circumference of the electrode assembly. A completing part, at which the outermost end of the separator is positioned in the outer circumference of the electrode assembly, is also wrapped in the sealing tape. The sealing tape can be attached so that the separator is exposed through the upper end and the lower end in the outer circumference of the electrode assembly.

In another aspect of the current invention, the sealing tape comprises a plurality of sub-sealing tapes separated from each other, and the sub-sealing tapes can comprise the completing part to be attached to predetermined regions of the outer circumference. The shape of the sub-sealing tape can be square. The shape of the sealing tape can be longitudinally rectangular to extend the length of the cylinder-type can. The sealing tape is preferably formed to occupy at least 30% of the entire area of the outer circumference of the electrode assembly.

The sealing tape can be formed of a polymer material. The polymer material can be formed of one selected from the group comprising polymer materials comprising an ester group or a carboxylic group, polyvinylidene fluoride (hereinafter, PVDF), polybutadiene, and polyisoprene.

In another aspect, there is provided an electrode assembly for a lithium ion secondary battery comprising a positive electrode plate and a negative electrode plate that face each other, a separator interposed between the positive electrode plate and the negative electrode plate, and a sealing tape attached to the outer circumference of a jelly roll obtained by winding the positive electrode plate, the negative electrode plate, and the separator. The sealing tape comprises a material layer and a coating layer formed on the external or internal surface of the material layer, and the coating layer is formed of a material that absorbs an electrolyte to swell.

The material layer can be formed of a polymer selected from the group comprising polyethylene (PE), polypropylene (PP), and polyimide (PI). The material layer can be attached to wrap the outer circumference of the electrode assembly. The coating layer can comprise a plurality of sub-coating layers separated from each other, and the sub-coating layers can be formed on predetermined regions of the external or internal surface of the material layer. Further, the material layer may not extend about the entire outer circumference of the electrode assembly but comprise a plurality of sub-material layers to which the coating is applied. The shape of the material and sub-coating layers can be square. The shape of the material and sub-coating layers can be longitudinally rectangular so as to provide the appearance of the electrode assembly being entirely striped. The coating layer is preferably formed to occupy at least 30% of the entire area of the material. The coating layer can be formed of polyacrylate when the coating layer is formed on the entire external or internal surface of the material.

The coating layer can be formed on the entire external or internal surface of the material. In this case, the coating layer can be formed to have one shape among the above-described shapes. The coating layer can be formed of a polymer from the group comprising polymer materials comprising an ester group or a carboxylic group, polyvinylidene fluoride, polybutadiene, and polyisoprene. The coating layer is formed to a thickness of at least 1 μm.

There is provided a lithium ion secondary battery comprising an electrode assembly including a positive electrode plate and a negative electrode plate that face each other; a separator interposed between the positive electrode plate and the negative electrode plate; a sealing tape attached to the outer circumference of a jelly roll obtained by winding the positive electrode plate, the negative electrode plate, and the separator; a can to accommodate the electrode assembly; and a cap assembly to seal an opening on the top of the can. The sealing tape is formed of a material that absorbs an electrolyte to swell or a coating layer formed of the material is formed on the external or internal surface of a material.

The sealing tape can be formed to have one shape among the above-described shapes. The sealing tape or the coating layer can be formed of a polymer from the group comprising polymer materials comprising an ester group or a carboxylic group, polyvinylidene fluoride, polybutadiene, and polyisoprene. The coating layer is formed to a thickness of at least 1 μm.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2A:
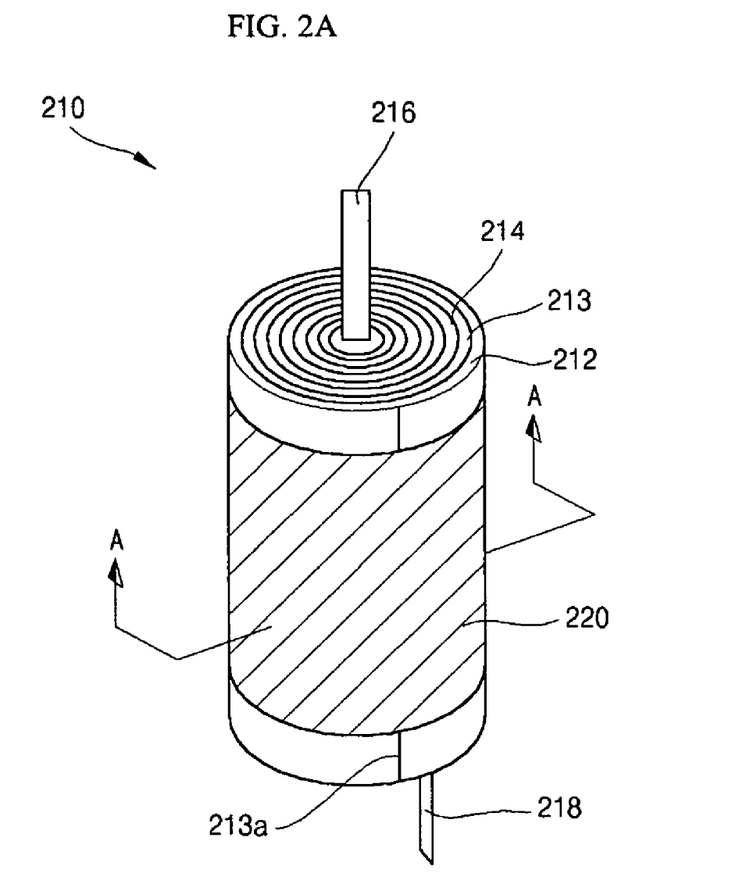
FIG. 2A is a perspective view of an electrode assembly for a lithium ion secondary battery according to an embodiment of the present invention.
Figure 2B:
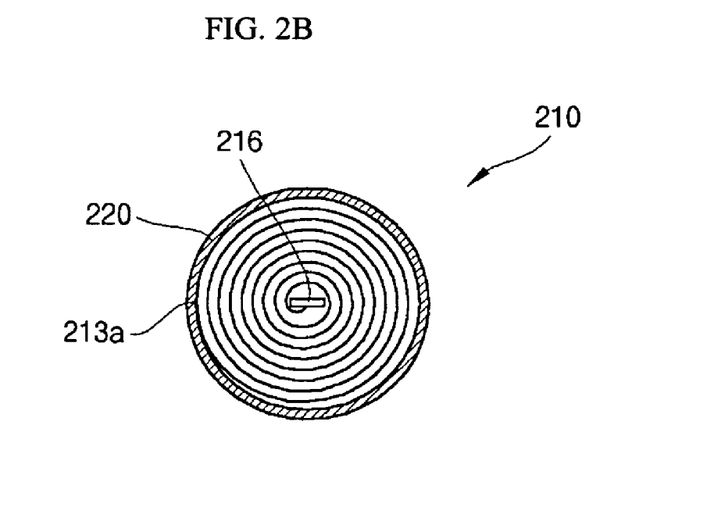
FIG. 2B is a sectional view taken along the line A-A of FIG. 2A.

FIG. 2A is a perspective view of an electrode assembly for a lithium ion secondary battery according to an embodiment of the present invention. FIG. 2B is a sectional view taken along the line A-A of FIG. 2A. Hereinafter, the width of a sealing tape 220 before being attached to the outer circumference of an electrode assembly 210 is referred to as a length and the length of the sealing tape 220 before being attached to the outer circumference of the electrode assembly 210 is referred to as a width.

Referring to FIGS. 2A and 2B, the electrode assembly 210 for the lithium ion secondary battery according to this embodiment of the present invention includes a positive electrode plate 212, a separator 213, and a negative electrode plate 214. The electrode assembly 210 includes a positive electrode tab 216, a negative electrode tab 218, and the sealing tape 220.

The positive electrode plate 212 includes a positive electrode collector, a positive electrode active material layer, and a positive electrode non-coating portion. The positive electrode collector can be formed of a conductive metal to flow current from the positive electrode active material layer to an external circuit. The positive electrode active material layer is manufactured by mixing a positive electrode active material, a conductive material, and a binder. The positive electrode collector is at least partially coated with the positive electrode active material layer, applied at a predetermined thickness. The positive electrode non-coating portion is an area in which the positive electrode active material layer is not applied to the positive electrode collector. The positive electrode tab 216 can be welded to one side of the positive electrode non-coating portion of the positive electrode collector.

The negative electrode plate 214 includes a negative electrode collector, a negative electrode active material layer, and a negative electrode non-coating portion. The negative electrode collector can be formed of a conductive metal to collect electrons from the negative electrode active material layer and to move the collected electrons to the external circuit. The negative electrode active material layer is manufactured by mixing a negative electrode active material, a conductive material, and a binder. The negative electrode collector is at least partially coated with the negative electrode active material layer, applied at a predetermined thickness. The negative electrode non-coating portion is an area in which the negative electrode active material layer is not applied to the negative electrode collector. The negative electrode tab 218 can be welded to one side of the negative electrode non-coating portion of the negative electrode collector.

The positive electrode tab 216 and the negative electrode tab 218 are welded to the positive electrode non-coating portion and the negative electrode non-coating portion, respectively. The positive electrode tab 216 and the negative electrode tab 218 electrically connect the electrode assembly 210 and the other parts of the battery to each other, including the cap assembly and cylinder-type can, not shown. The positive electrode tab 216 and the negative electrode tab 218 can be welded by supersonic welding or resistance welding and lamination tapes can be attached to the welding parts in order to prevent a short circuit and the generation of heat. The welding method of the positive electrode tab 216 and the negative electrode tab 218 is not limited to these disclosed herein.

The sealing tape 220 can be attached to the outer circumference of the jelly-role electrode assembly 210 obtained by winding the positive electrode plate 212, the negative electrode plate 214, and the separator 213. To be specific, the sealing tape 220 is arranged about the outer circumference of the jelly-role electrode assembly 210 including a completing part 213a at which the outermost end of the separator 213 at the outer circumference of the electrode assembly 210 is positioned. The sealing tape 220 is positioned between the outer circumference of the electrode assembly 210 and the internal surface of the cylinder-type can, not shown. As illustrated in FIG. 2A, the sealing tape 220 can be attached to the part excluding the upper end and the lower end of the outer circumference of the electrode assembly 210. The upper end without the sealing tape 220 creates a space between the cylinder-type can and the electrode assembly 210 through which the electrolyte can penetrate. The lower end is a part in which the electrolyte injected into the bottom of the cylinder-type can contact the electrode assembly 210. The sealing tape 220 is generally not arranged about the upper end and the lower end of the cylinder-type can so that the electrolyte may impregnate the electrode assembly 210 and the sealing tape 220. When the sealing tape 220 is attached to the electrode assembly 210 such that the upper end and the lower end of the outer circumference of the electrode assembly 210 are excluded from coating, the separator 213 that wraps about the outer circumference is exposed.

Also, although not shown in the drawing, the sealing tape 220 can be attached to wrap the entire outer circumference of the electrode assembly 210, from the lower end to the upper end. If the sealing tape 220 extends from the lower end to the upper end of the electrode assembly 210, the sealing tape 220 does not significantly affect the impregnation of the electrolyte into the electrode assembly 210 because the sealing tape 220 is formed of a material with a high affinity for the electrolyte such that the electrolyte is easily diffused through and absorbed into the sealing tape 220. The width of the sealing tape 220 is not limited to that disclosed herein.

The sealing tape 220 can be formed to have the length equal to or smaller than the outer circumference of the electrode assembly 210. When the sealing tape 220 is formed to wrap the entire outer circumference of the electrode assembly 210, the length of the sealing tape 220 can be formed to be equal to the length of the outer circumference of the electrode assembly 210. Also, when the sealing tape 220 is formed to wrap a part of the outer circumference, including the completing part 213a, the length of the sealing tape 220 can be formed to be smaller than the length of the circumference. However, when the length of the sealing tape 220 is formed to be greater than the outer circumference of the electrode assembly 210, the ends of the sealing tape 220 overlap so that the thickness of the sealing tape 220 increases. Such increase in thickness is not desirable.

The shape of the sealing tape 220 attached to the outer circumference of the electrode assembly 210 is generally square or longitudinally rectangular and has a uniform shape and uniformly support the electrode assembly 210 within the cylinder-type can, not shown. Also, the sealing tape 220 can be formed so as to seal an electrode assembly with varying diameters along the length of the central axis of the electrode assembly, such as if the upper portion of the electrode assembly has a greater diameter than the lower portion of the same electrode assembly.

The sealing tape 220 can be formed of a polymer material. To be specific, the sealing tape 220 is formed of a polymer material including an ester group or a carboxylic group or a polymer selected from the group comprising polyvinylidene fluoride, polybutadiene, polyisoprene. The kind of the polymer material is not limited to the above. The polymer material absorbs a solvent and swells. Swelling is a characteristic of the polymer material in which solvent molecules penetrate spaces between the chains of the polymer material so that the volume of the polymer material increases. The polymer material has a crystalline part and an amorphous part such that the amorphous part has large spaces to be penetrated by the solvent molecules. Swelling occurs more rapidly in the amorphous regions of the polymer than in the crystalline areas. Since the distance between polymer chains is smaller in the crystalline part of the polymer in comparison to the amorphous part, swelling of the crystalline parts of the polymer is less extensive and less likely.

The PVDF, having the structure of $-[CH_2-CF_2-]_n$, is a fluoropolymer used as a binder when the collector is coated with electrode active materials. The main chain of the fluoropolymer has the same bond as the C-C bond of polyolefin, single carbon-carbon bonds. A fluoropolymer is a synthetic resin having a structure in which some or all of the hydrogens of the carbon backbone are replaced by fluorine atoms (F). Polytetrafluorethylene, a fluoropolymer, contains a carbon backbone having all of the hydrogens replaced by fluorine atoms and is commonly known as Teflon®.

Aspects of the current invention also incorporate polymers containing ester groups and/or carboxylic groups. The ester group is an atom group that forms an aliphatic compound represented by RCOOR', in which the carbon atom has formed a double bond with one of the oxygen atoms. Esters may be formed from esterfication, which is the condensation reaction of an organic or inorganic acid, such as a carboxylic acid derivative, and an alcohol or phenol that results in the elimination of water. The carboxylic group is an atom group that forms an aliphatic compound represented by RCOOH. Since polymer materials including the PVDF group, the ester group, and the carboxylic group have an affinity for the non-aqueous electrolyte, the sealing tape can be easily wetted by the electrolyte to absorb the electrolyte and to swell. The polybutadiene and the polyisoprene are nonpolar rubbers having high rates of unsaturation, or a high number of carbon-carbon double bonds in the polymer's carbon backbone. Polybutadiene and polyisoprene are homopolymers generated by the combination of butadiene and isoprene monomers, respectively. Polybutadiene and polyisoprene are materials that easily absorb a non-aqueous organic solvent to swell.

Since the sealing tape 220 is formed of the above-described materials, which absorb the electrolyte and swell, the sealing tape 220 expands between the external surface of the electrode assembly 210 and the internal surface of the can so as to prevent the electrode assembly 210 from rotating or floating in the can.

Figure 3A:
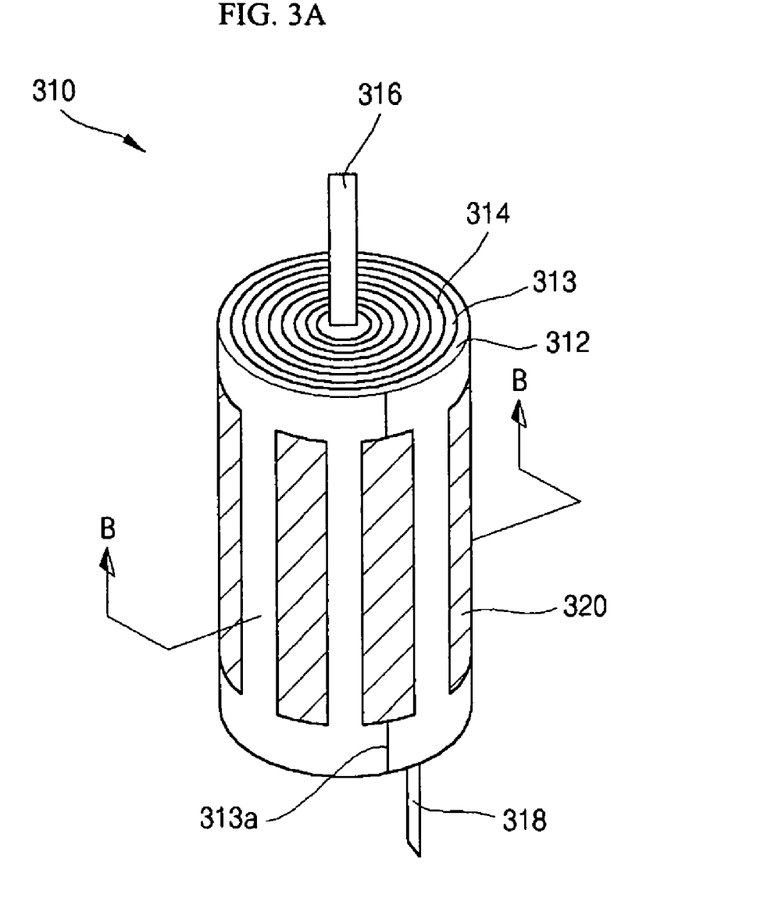
FIG. 3A is a perspective view of an electrode assembly for a lithium ion secondary battery according to another embodiment of the present invention.
Figure 3B:
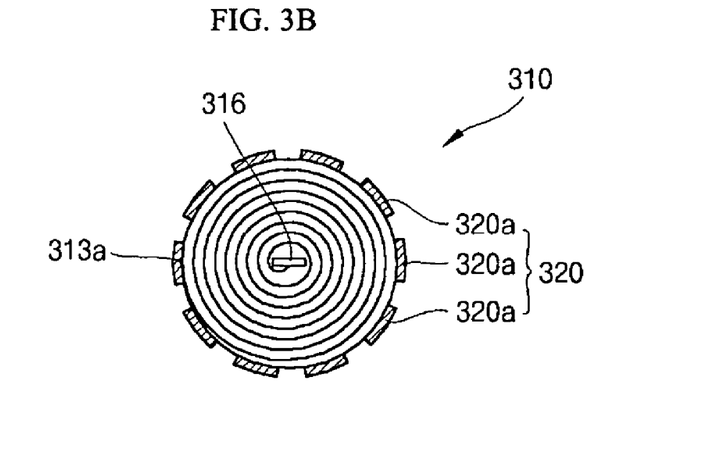
FIG. 3B is a sectional view taken along the line B-B of FIG. 3A.

FIG. 3A is a perspective view of an electrode assembly for a lithium ion secondary battery according to another embodiment of the present invention. FIG. 3B is a sectional view taken along the line B-B of FIG. 3A. Since the embodiment of FIG. 3A is similar to the embodiment of FIG. 2A, the differences between the embodiment of FIG. 2A and the embodiment of FIG. 3A will be described. FIG. 3A illustrates that the sealing tape 320 is cut into a plurality of sub-sealing tapes 320a such that each sub-sealing tape 320a is separated from each adjacent sub-sealing tape 320a by a predetermined distance attached to the outer circumference of an electrode assembly 310.

Referring to FIGS. 3A and 3B, an electrode assembly 310 for a lithium ion secondary battery according to another embodiment of the present invention includes a positive electrode plate 312, a separator 313, and a negative electrode plate 314. The electrode assembly 310 includes a positive electrode tab 316, a negative electrode tab 318, and a sealing tape 320. Since the positive electrode plate 312, the negative electrode plate 314, the separator 313, the positive electrode tab 316, and the negative electrode tab 318 are similar to those of the embodiment of FIG. 2A, detailed description thereof will be omitted.

The sealing tape 320 comprises a plurality of sub-sealing tapes 320a separated from each adjacent sub-sealing tape 320a by a predetermined distance and the sub-sealing tapes 320 can be attached to predetermined regions of the outer circumference of the electrode assembly 310, including the completing part 313a. That is, the sealing tape 320 formed to have a uniform width is cut to a predetermined length and attached to the predetermined regions of the outer circumference. The sealing tape 320 is attached to the completing part 313a of the separator 313 in order to prevent the wound electrode assembly 310 from unwinding. The areas between the adjacent sub-sealing tapes 320a function as space through which the electrolyte can travel to penetrate the lower part of the can during the impregnation of the electrolyte. When the volume of the sub-sealing tapes 320a is too small, i.e., when the sub-sealing tapes 320a are too short or too narrow, the sub-sealing tapes 320a cannot swell enough to sufficiently hold the electrolyte assembly 310. However, when the number of sub-sealing tapes 320a is too large or when the sub-sealing tapes 320a are too wide, the impregnation of the electrolyte is prohibited. The number of sub-sealing tapes 320a is not too large so as to allow for sufficient impregnation of the electrolyte. The number of sub-sealing tapes 320a, however, is not limited. The sealing tape 320 can be attached to the part excluding the upper end and the lower end so that the separator 313 is exposed at the upper end and the lower end of the electrode assembly 310. Also, as illustrated with reference to the embodiment of FIG. 2A, the sealing tape 320 can be attached to the entire outer circumference including the upper end and the lower end of the electrode assembly 310.

Figure 7:
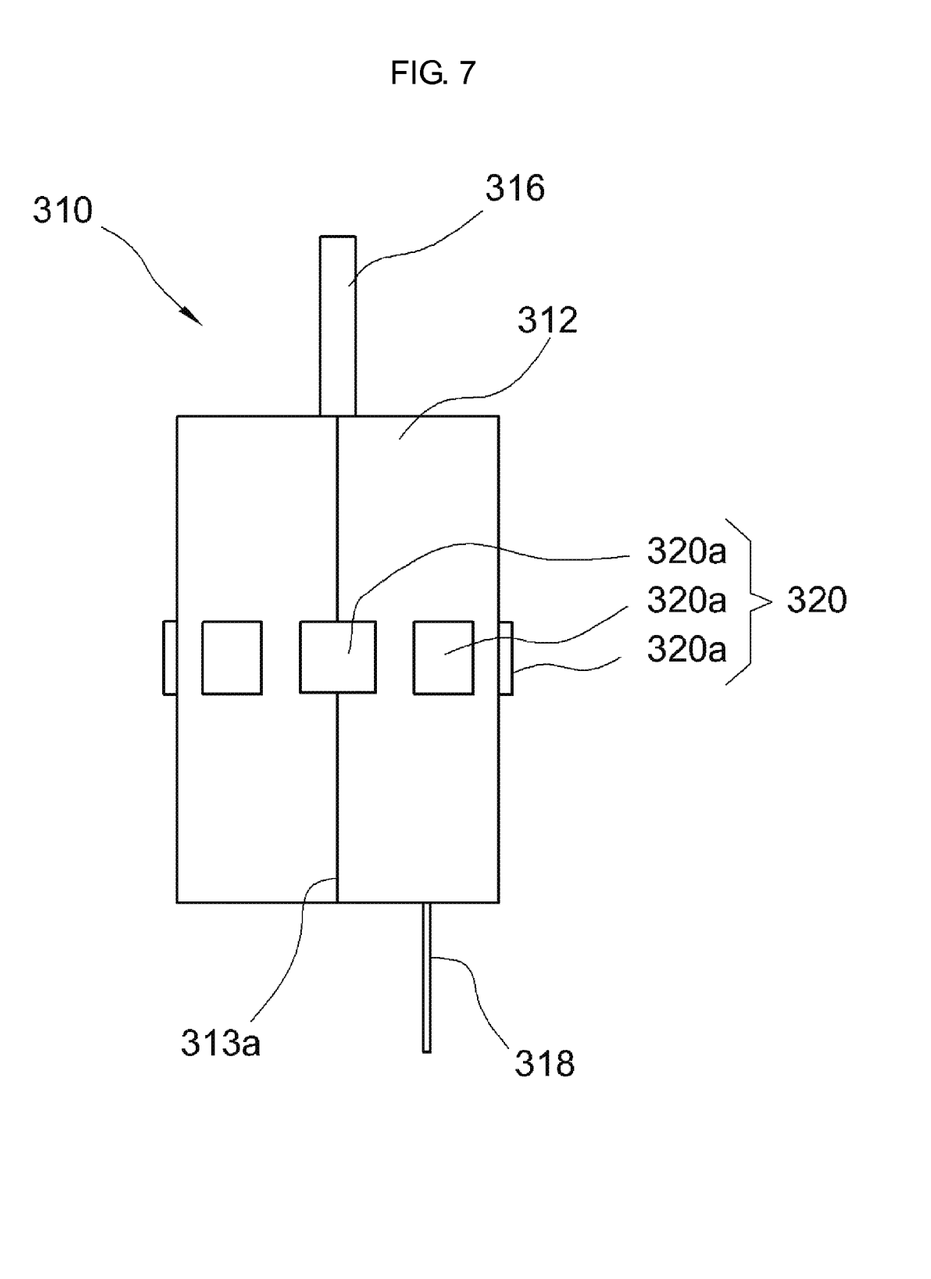
FIG. 7 is a perspective view of an electrode assembly for a lithium ion secondary battery according to still another embodiment of the present invention.

The shapes of the sub-sealing tapes 320a are square (as shown in FIG. 7) or longitudinally rectangular (as shown in FIGS. 3A and 3B) and have uniform shapes. The sealing tape 320 can be entirely striped, meaning that the sub-sealing tapes 320a are arranged about the circumference of the electrode assembly 310 resulting in a striped appearance. Also, the sealing tape 320 is formed to occupy at least 30% of the entire area of the outer circumference. When the area in which the sealing tape 320 is attached is less than 30% of the entire area of the outer circumference of the electrode assembly 310, the volumes of the sub-sealing tapes 320a are too small so that the degree of swelling is insufficient. The resulting insufficient swelling causes the adhesive properties of the sealing tape 320 that holds the electrode assembly 310 in the cylinder-type can to fail. The sealing tapes 320, comprising the sub-sealing tapes 320a, are formed of a polymer material that easily absorbs the electrolyte to swell such as a polymer material including an ester group or a carboxylic group or one selected from the group comprising polyvinylidene fluoride, polybutadiene, polyisoprene, and equivalents.

Figure 4:
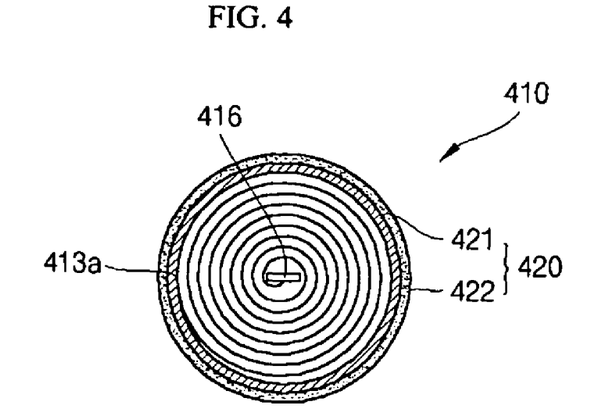
FIG. 4 is a horizontal sectional view of an electrode assembly for a lithium ion secondary battery according to still another embodiment of the present invention.

FIG. 4 is a horizontal sectional view of an electrode assembly for a lithium ion secondary battery according to still another embodiment of the present invention. Since the embodiment of FIG. 4 is similar to the embodiment of FIG. 2A, the differences between the embodiment of FIG. 2A and the embodiment of FIG. 4 will be described. FIG. 4 illustrates an electrolyte assembly 420 that comprises a coating layer made of a swelling polymer material that is formed on the surface of the polyolefin based material used as the conventional sealing tape material. The coating layer may be formed on the entire external or internal surface of the material. In FIG. 4, the coating layer is formed on the entire external surface of the material.

Referring to FIG. 4, in an electrode assembly 410 for a lithium ion secondary battery according to still another embodiment of the present invention, a sealing tape 420 comprising a coating layer 422 formed on a surface of a material 421 is attached to the outer circumference of the electrode assembly 410. The coating layer 422 comprises a material that has a high affinity for the absorption of the electrolyte, which results in swelling of the coating layer 422. The coating layer 422 can be formed on the entire external or internal surface of the material 421. The sealing tape 420 can be attached to wrap about the outer circumference, including the completing part 413a of the outer circumference of the electrode assembly 410. The sealing tape 420 may be attached to the outer circumference of the electrode assembly 410 either including or excluding the upper end and the lower ends of the electrode assembly 410, as described in association with the embodiment of FIG. 2A.

The material 421 can be formed of the polyolefin based material such as polyethylene (PE), polypropylene (PP), and polyimide (PI). Polyethylene (PE) is commonly used as the material of the sealing tape. Since the difference in surface energy between the polyethylene (PE) and the non-aqueous electrolyte is large, the polyethylene resists combining with the electrolyte molecules such that when polyethylene (PE) is smeared with the electrolyte, the electrolyte spherically lumps together due to surface tension. Polyethylene (PE) does not have a high affinity for the electrolyte and does not swell easily.

When the coating layer 422 is formed on the external surface of the material 421, the coating layer 422 can be formed of a material having a high affinity for the electrolyte so that the material swells and secures the electrode assembly 410 inside the cylinder-type can. Such a material is PVDF. The coating layer 422 is a polymer from the group comprising polymer materials comprising an ester group or a carboxylic group, polyvinylidene fluoride (hereinafter, PVDF), polybutadiene, and polyisoprene. The coating layer 422 is preferably formed to a thickness of at least 1 µm, and more preferably, to a thickness of 10 µm. When the thickness of the coating layer 422 is less than 1 µm, the coating layer 422 is unable to swell sufficiently to secure the electrode assembly 410 in the cylinder-type can.

When the coating layer 422 is formed on the internal surface of the material 421, an adhesive component such as poly-acrylate can be used. The poly-acrylate includes polymethyl methacrylate (PMMA), polyethyl methacrylate (PEMA), and polybutylmethacrylate (PBMA). The polyacrylate, in particular the PMMA, melts when it contacts the electrolyte. Thus, the polyacrylate is crosslinked so that the polyacrylate does not melt but instead swells in such circumstances. It is possible to easily control the degree of swelling in accordance with the specifications of the electrode assembly 410 and the cylinder-type can when the coating layer 422 is formed of the adhesive component because it is easy to manufacture a tape in which adhesive components vary in thickness.

In the sealing tape 420, the coating layer 422 is formed on the external or internal surface of the material 421 and absorbs the electrolyte molecules so as to swell and prevent the electrode assembly 410 from floating or rotating in the can.

Figure 5A:
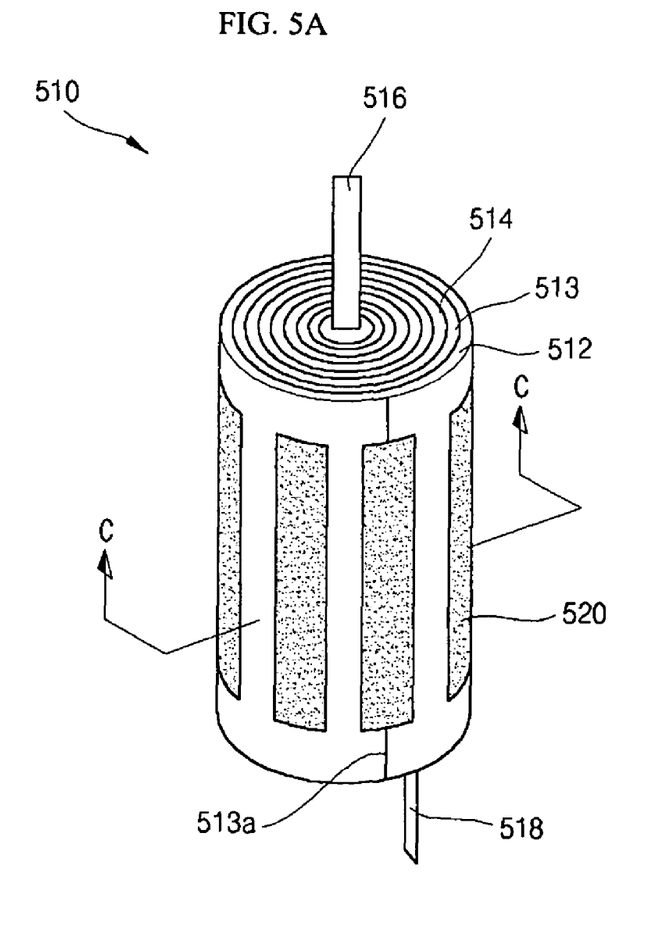
FIG. 5A is a perspective view of an electrode assembly for a lithium ion secondary battery according to still another embodiment of the present invention.
Figure 5B:
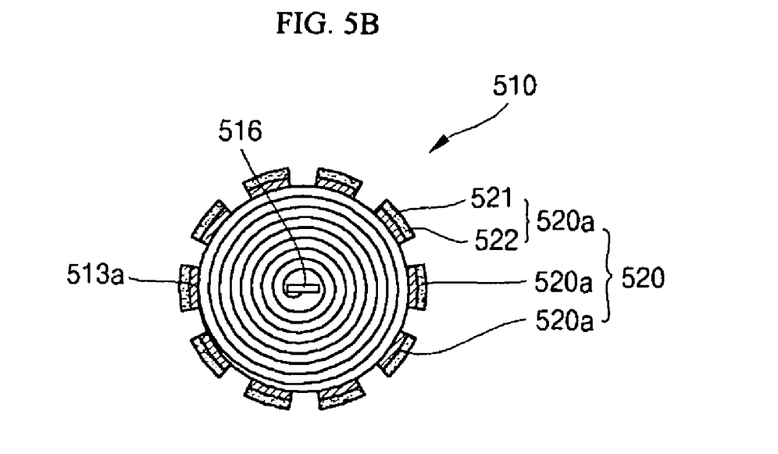
FIG. 5B is a sectional view taken along the line C-C of FIG. 5A.

FIG. 5A is a perspective view of an electrode assembly for a lithium ion secondary battery according to still another embodiment of the present invention. FIG. 5B is a sectional view taken along the line C-C of FIG. 5A. Since the embodiment of FIG. 5A is similar to the embodiment of FIG. 4, the differences between the embodiment of FIG. 4 and the embodiment of FIG. 5B will be described. FIG. 5A illustrates a plurality of sealing tapes 520, comprising a double-layer structure of material layer 521 and a coating layer 522, that are separated from each other by a predetermined distance and attached to the outer circumference of the an electrode assembly 510. That is, the embodiment of FIG. 5A is similar to the embodiment of FIG. 3A in that the plurality of cut sealing tapes 520 are separated from each other by the predetermined distance and attached to the outer circumference, and FIG. 5A is similar to the embodiment of FIG. 4 in that the sealing tape 520 is formed to have a double-layer structure of a material layer 521 and a coating layer 522.

Referring to FIGS. 5A and 5B, an electrode assembly 510 for a lithium ion secondary battery according to still another embodiment of the present invention includes the sealing tape 520 in which a plurality of sub-sealing tapes 520a are separated from each other and attached to predetermined regions of the outer circumference of the electrode assembly 510, including the completing part 513a. Each of the sub-sealing tapes 520a is composed of the material layer 521 formed of a polyolefin-based material such as the polyethylene (PE) and a coating layer 522 formed of the PVDF. The shape of the sub-sealing tapes 520a can be square or longitudinally rectangular. The sub-sealing tapes 520a are generally evenly arranged about the circumference of the electrode assembly 510 such that the electrode assembly 510 appears to be entirely striped. The sub-sealing tapes 520a can extend from the lower end of the electrode assembly 510 to the upper end of the electrode assembly 510 or not. The sealing tape 520 is generally formed to occupy at least 30% of the entire area of the outer circumference. The coating layer 522 is generally formed to a thickness of at least 1 µm. After forming the coating layer 522 on one side surface of the material layer 521 with a predetermined width, the sealing tape 520 is cut to a predetermined length to be attached to the outer circumference. In the drawing, the coating layer 522 is formed on the external surface of the material layer 521, however, the coating layer 522 can be formed on the internal surface of the material layer 521. When the coating layer 522 is formed on the internal surface of the material layer 521, the coating layer 522 can be formed of an adhesive component as illustrated in the embodiment of FIG. 4, a crosslinked, adhesive polyacrylate from the group comprising polymethyl methacrylate, polyethyl methacrylate, and polybutylmethacrylate.

Figure 6A:
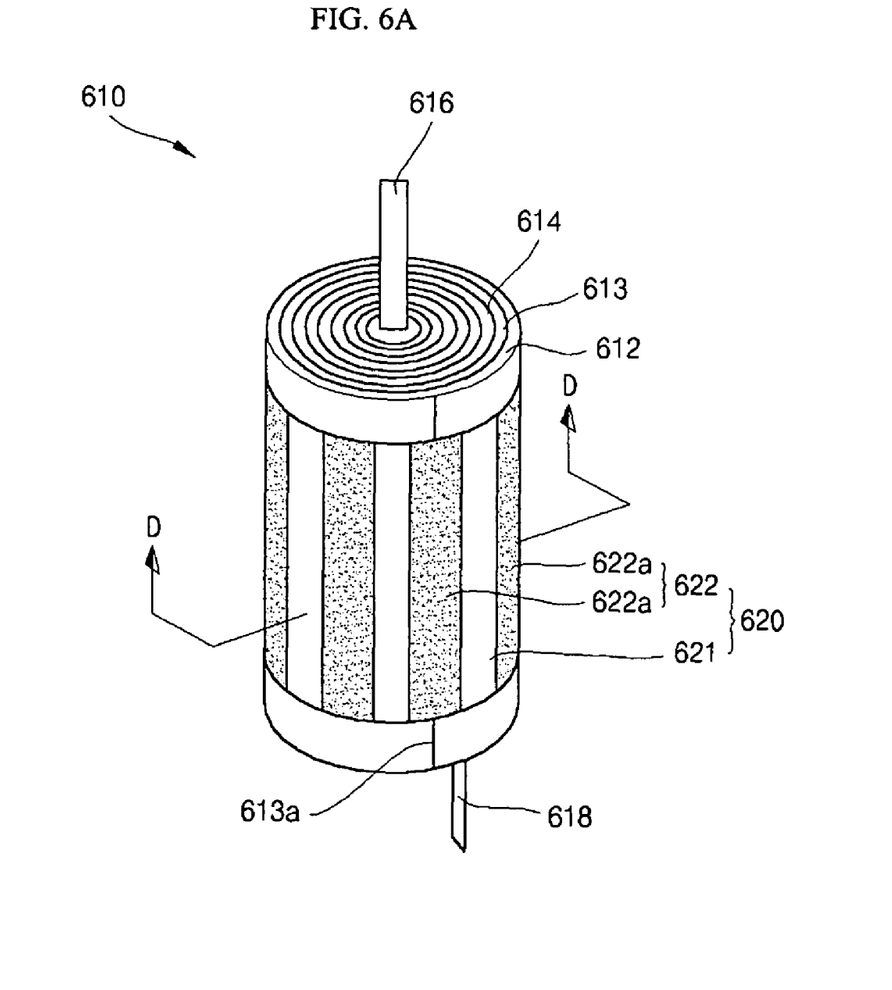
FIG. 6A is a perspective view of an electrode assembly for a lithium ion secondary battery according to still another embodiment of the present invention.
Figure 6B:
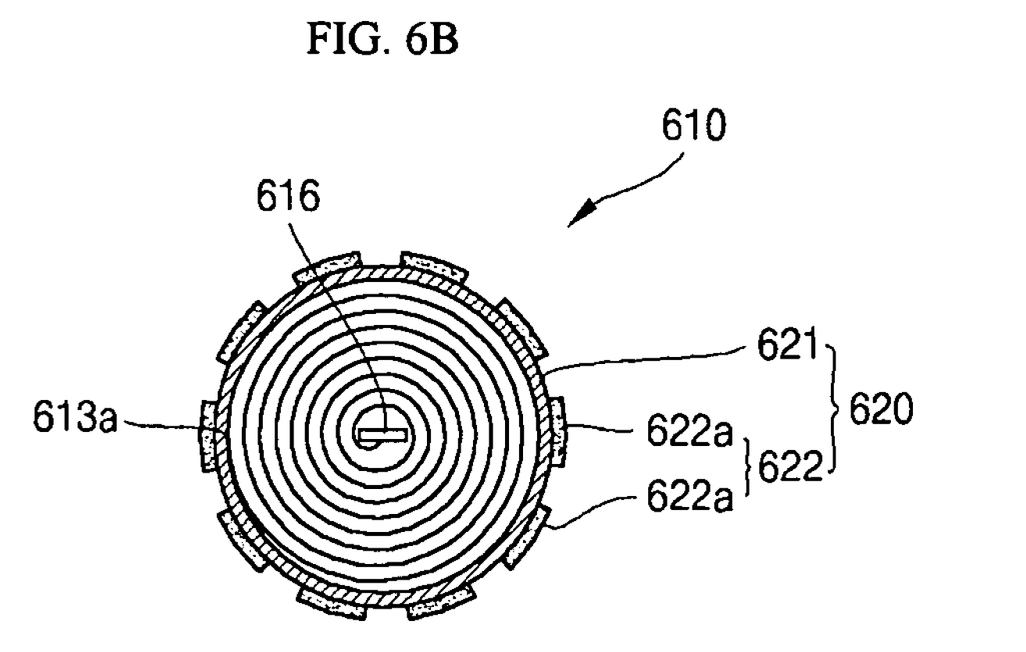
FIG. 6B is a sectional view taken along the line of D-D of FIG. 6A.

FIG. 6A is a perspective view of an electrode assembly for a lithium ion secondary battery according to still another embodiment of the present invention. FIG. 6B is a sectional view taken along the line of D-D of FIG. 6A. Since the embodiment of FIG. 6A is similar to the embodiment of FIG. 4, the differences between the embodiment of FIG. 4 and the embodiment of FIG. 6A will be described in detail. FIG. 6A illustrates a material layer 621 that is formed to wrap about the outer circumference of an electrode assembly 610, however, a coating layer 622 comprising a plurality of sub-coating layers 622a is formed on the external or internal surface of the material layer 621 and each individual sub-coating layer 622a is separated from the adjacent sub-coating layers 622 by a predetermined distance.

Referring to FIGS. 6A and 6B, an electrode assembly 610 for a lithium ion secondary battery according to still another embodiment of the present invention includes a sealing tape 620 in which a material layer 621 is attached to wrap about the outer circumference of the electrode assembly 610 and a coating layer 622 includes a plurality of sub-coating layers 622a separated from each other and attached to predetermined regions of the material layer 621. Since the material of the coating layer 622 and the material of the material layer 621 were described in detail with reference to the embodiment of FIG. 4, a detailed description thereof will be omitted. The shape of the sub-coating layers 622a can be square or longitudinally rectangular. The sub-coating layers 622a are arranged about the circumference of the electrode assembly 610 such that the electrode assembly 610 appears to be entirely striped. Thus, the material layer 621 is exposed to the outside through the distance between the sub-coating layers 622a. The material layer 621 is exposed between the sub-coating layers 622a and swells to almost no degree when the electrolyte is injected. As illustrated in FIG. 6B, the horizontal section of the sealing tape 620 appears saw toothed. When the electrolyte is injected, the coating layer 622 swells and the saw teeth are enlarged. The coating layer 622 is generally formed to occupy at least 30% of the entire area of the material layer 621. The coating layer 622 is generally formed to a thickness of at least 1 µm.

The electrode assembly for the lithium ion secondary battery according to this embodiment of the present invention can be applied to the lithium ion secondary battery illustrated in FIG. 1. Although not shown in the drawing, the electrode assembly for the lithium ion secondary battery according to the above-described and other embodiments of the present invention can be applied to the polygon type lithium ion secondary battery. Therefore, the structure of the lithium ion secondary battery to which the electrode assembly for the lithium ion secondary battery is applied may have any structure and is not limited.

Next, the operation of the lithium ion secondary battery to which the electrode assembly according to aspects of the present invention is applied will be described. Hereinafter, the electrode assembly and the lithium ion secondary battery according to the embodiment of FIG. 2A will be described.

Referring to FIG. 2A, in the electrode assembly 210, the sealing tape 220 can be attached to the outer circumference of the jelly roll obtained by laminating and winding the positive electrode plate 212, the separator 213, and the negative electrode plate 214. The sealing tape 220 can be formed of the polymer material that absorbs the electrolyte to swell. The case in which the sealing tape 220 is formed of the PVDF will be taken as an example. The PVDF is composed of the crystalline part in which the structure $-[CH_2-CF_2-]_n$ is endlessly repeated to have regularity and organization and the amorphous part in which the molecules are randomly arranged without regularity. For example, the crystalline areas are similar to uncooked spaghetti lying parallel, while the amorphous areas are like cooked spaghetti on a plate. When the electrolyte is injected into the cylinder-type can, the electrolyte molecules first penetrate the amorphous part of the PVDF to open the polymer chains and cause the volume of the sealing tape 220 to increase. After a length of time, a certain amount of the electrolyte molecules penetrate the crystalline part so that the volume of the sealing tape 220 further increases. When the volume of the sealing tape 220 increases, the sealing tape contacts both the cylinder-type can and the electrode assembly 220, and supports and suspends the electrode assembly 220 within the electrolyte in the cylinder-type can. The suspension of the electrode assembly 220 prevents the electrode assembly 220 from floating or rotating in the cylinder-type can and protects the electrode assembly from shock and damage from outside forces and impacts. The sealing tape 220 supports and protects the electrode assembly 210, which is unique to the sealing tape 220.

In the herein-disclosed electrode assembly for the lithium ion secondary battery according of the present invention, the sealing tape is formed of a material having an affinity for an electrolyte such that the sealing tape absorbs the electrolyte and swells. Other aspects of the invention include coating the external or internal surface of the conventional sealing tape with such a material so that, when the sealing tape is impregnated with the electrolyte, the sealing tape swells to support and protect the electrode assembly and to thus prevent the welding parts of the electrode tabs from being disconnected due to the rotation or floating of the electrode assembly.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode assembly for a lithium ion secondary battery comprising:
    a jelly roll assembly comprising a positive electrode plate, a negative electrode plate, and a separator between the positive electrode and the negative electrode plate, the positive electrode plate, the negative electrode plate, and the separator being wound together; and
    a sealing tape attached to an outer circumference of the jelly roll assembly the sealing tape comprising a plurality of sub-sealing tapes, the sub-sealing tapes being spaced apart from each other,
    wherein the sealing tape absorbs an electrolyte to increase in volume, and is arranged to cover a completing part of the electrode assembly, the completing part being where an outermost end of the separator is positioned at the outer circumference of the jelly roll assembly, and
    wherein the sealing tale is attached so that the separator is exposed through an upper end of the outer circumference of the jelly roll assembly and/or a lower end of the outer circumference of the jelly roll assembly.

2. The electrode assembly of claim 1, wherein the shape of each of the sub-sealing tapes is square.

3. The electrode assembly of claim 1, wherein the shape of each of the sub-sealing tapes is longitudinally rectangular.

4. The electrode assembly of claim 1, wherein the sealing tape occupies at least 30% of an entire area of the outer circumference of the jelly roll assembly.

5. The electrode assembly of claim 1, wherein the sealing tape comprises a polymer material.

6. The electrode assembly of claim 5, wherein the polymer material comprises at least one of an ester group, a carboxylic group, polyvinylidene fluoride, polybutadiene, or polyisoprene.

7. An electrode assembly for a lithium ion secondary battery comprising:
    a jelly roll assembly comprising a positive electrode plate, a negative electrode plate, and a separator between the positive electrode plate and the negative electrode plate, the positive electrode plate, the negative electrode plate, and the separator being wound together; and
    a sealing tape attached to an outer circumference of the jelly roll assembly,
    wherein the sealing tape comprises a material layer and a coating layer on a first or second surface of the material layer, the material layer being arranged about the outer circumference of the jelly roll assembly, the coating layer comprising a plurality of sub-coating layers, the sub-coating layers being spaced apart from each other, the sub-coating layers being on regions of the first or second surface of the material layer, the first surface of the material layer facing an interior of the jelly roll assembly and the second surface facing an exterior of the jelly roll assembly,
    wherein the sealing tape is attached so that the separator is exposed through an upper end of the outer circumference of the jelly roll assembly and/or a lower end of the outer circumference of the jelly roll assembly, and
    wherein the coating layer absorbs an electrolyte to increase in volume, and is arranged to cover a completing part of the jelly roll assembly, the completing part being where an outermost end of the separator is positioned at the outer circumference of the jelly roll assembly.

8. The electrode assembly of claim 7, wherein the material layer comprises at least one of polyethylene, polypropylene, or polyimide.

9. The electrode assembly of claim 7, wherein the shape of each of the sub-coating layers is square.

10. The electrode assembly of claim 7, wherein the shape of each of the sub-coating layers is longitudinally rectangular.

11. The electrode assembly of claim 7, wherein the coating layer is formed to occupy at least 30% of an entire area of the material layer.

12. The electrode assembly of claim 7, wherein the coating layer is formed on the entire first or second surface of the material layer.

13. The electrode assembly of claim 7, wherein the sealing tape is arranged to cover the outer circumference of the jelly roll assembly except for an upper end of the outer circumference of the jelly roll assembly and/or a lower end of the outer circumference of the jelly roll assembly.

14. The electrode assembly of claim 7, wherein the coating layer comprises an adhesive that absorbs the electrolyte when the coating layer is on the first surface of the material layer.

15. The electrode assembly of claim 7, wherein the coating layer comprises a polymer material.

16. The electrode assembly of claim 15, wherein the polymer material comprises at least one of an ester group, a carboxylic group, polyvinylidene fluoride, polybutadiene, or polyisoprene.

17. The electrode assembly of claim 7, wherein the coating layer has a thickness of at least 1 µm.

18. A lithium ion secondary battery comprising:
    an electrode assembly comprising a jelly roll assembly comprising a positive electrode plate, a negative electrode plate, and a separator between the positive electrode plate and the negative electrode plate, the positive electrode plate, the negative electrode plate, and the separator being wound together, and a sealing tape attached to an outer circumference of the jelly roll assembly;
    a can to accommodate the electrode assembly; and
    a cap assembly to seal an opening on an end of the can,
    wherein the sealing tape comprises a first material that absorbs an electrolyte to increase in volume and a second material, and wherein a coating layer comprising the first material is on a first or second surface of the second material, the first surface facing an interior of the jelly roll assembly, the second surface facing an exterior of the jelly roll assembly,
    wherein the coating layer is arranged to cover a completing part of the jelly roll assembly, the completing part being where an outermost end of the separator is positioned at the outer circumference of the jelly roll assembly,
    wherein the coating layer comprises a plurality of sub-coating layers, the sub-coating layers being spaced apart from each other, and
    wherein the sealing tape is attached so that the separator is exposed through an upper end of the outer circumference of the jelly roll assembly and/or a lower end of the outer circumference of the jelly roll assembly.

19. The lithium ion secondary battery of claim 18, wherein the shape of each of the sub-coating layers is square.

20. The lithium ion secondary battery of claim 18, wherein the shape of each of the sub-coating layers is longitudinally rectangular.

21. The lithium ion secondary battery of claim 18, wherein the plurality of sub-coating layers occupies at least 30% of an entire area of the outer circumference of the jelly roll assembly.

22. The lithium ion secondary battery of claim 18, wherein the sub-coating layer comprises a polymer material.

23. The lithium ion secondary battery of claim 22, wherein the polymer material comprises at least one of an ester group, a carboxylic group, polyvinylidene fluoride, polybutadiene, or polyisoprene.

24. The lithium ion secondary battery of claim 18, wherein the coating layer has a thickness of at least 1 μm.

* * * * *

UNITED STATES PATENT AND TRADEMARK OFFICE
CERTIFICATE OF CORRECTION

| | | |
|---|---|---|
| PATENT NO. | : 7,960,048 B2 | Page 1 of 1 |
| APPLICATION NO. | : 11/646448 | |
| DATED | : June 14, 2011 | |
| INVENTOR(S) | : Seok Gyun Jang et al. | |

It is certified that error appears in the above-identified patent and that said Letters Patent is hereby corrected as shown below:

In the Claims

Column 13, Claim 1, line 19.        Before "and"
                                     Insert -- plate --

Column 13, Claim 1, line 23.        Delete "assembly"
                                     Insert -- assembly, --

Column 13, Claim 1, line 31.        Delete "tale"
                                     Insert -- tape --

Signed and Sealed this
Fourteenth Day of August, 2012

David J. Kappos
*Director of the United States Patent and Trademark Office*